Jan. 12, 1932.    W. A. CHRYST    1,840,701

SHOCK ABSORBER

Filed Sept. 16, 1929

Inventor
William A. Chryst
By
Spencer, Hardman and Fehr
Attorney

Patented Jan. 12, 1932

1,840,701

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed September 16, 1929. Serial No. 392,895.

This invention relates to improvements in hydraulic shock absorbers particularly adapted to control the movements of vehicle springs.

It is among the objects of the present invention to provide a shock absorber adapted to control both the compression and the rebound movements of vehicle springs.

A further object of the invention is to provide a shock absorber of simplified structure and design, which may be produced commercially at a minimum expenditure of time and material.

A further object of the invention is to provide a hydraulic shock absorber with a valve supported by a flexible member whereby sticking thereof, or disalignment, is substantially prevented.

Further objects and advantages of the present invention will be apparent from the following description, reference being had to the accompanying drawings, wherein a preferred embodiment of one form of the present invention is clearly shown.

Figure 1:
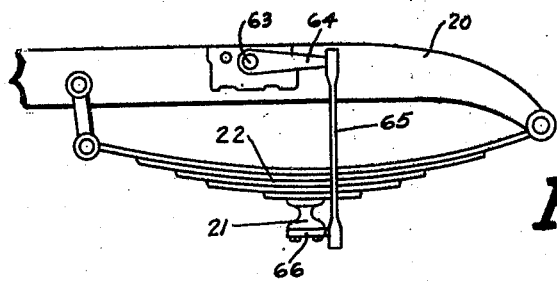
Fig. 1 is a fragmentary side view of the front end of a motor vehicle chassis with a shock absorber embodying the present invention provided thereon.

Referring to the drawings, the frame of the vehicle is designated by the numeral 20, said frame being supported upon the vehicle axle 21 by springs 22, only one of which is shown. The axle 21 is provided with road wheels, not shown for the sake of clearness.

The shock absorber comprises a casing 23, presenting a fluid reservoir 24 and a cylinder 25 in communication with said reservoir. One end of the cylinder 25 is closed by the end wall 26 of the casing, the other end of said cylinder being closed by a screw cap 27 provided with a suitable gasket 28 to prevent fluid leaks.

The cylinder 25 has a piston 26 reciprocably mounted therein, said piston having a recess provided intermediate its ends, said recess presenting two substantially parallel walls 29 and 30. The recess provides the piston with oppositely disposed piston head portions 31 and 32, the former forming compression chamber 33 in the cylinder, the latter the compression chamber 34. Piston head 31 has a passage 35 provided therein, while a similar passage 36 is provided in the piston head portion 32. An annular ridge 37 is formed about the one end of the passage 35, providing a valve seat in the piston head portion 31. A similar annular ridge 38 is provided about the one end of the passage 36, forming a valve seat within the piston head portion 32. Both piston head portions are recessed to receive a valve, the valve in piston head portion 31 being designated by the numeral 40, the valve in piston head portion 32 by the numeral 41. Each piston head portion is provided with an annular groove 42 adjacent the outer edge thereof. A helically wound, frusto-conically shaped spring 44 is provided in the piston head portion 31, the largest convolution at the one end of the spring being adapted to snap into locking engagement with the groove 42 of the piston head portion 31, while the smaller convolution at the opposite end of the spring 44 grippingly engages the valve 40 so that said valve is supported in a wobbly fashion whereby said spring may properly urge the valve into seating engagement with the valve seat 37 and also may maintain said valve in proper alignment with the valve seat whereby cocking of the valve and consequent leaks are substantially eliminated. The valve 41 is supported in a similar manner in the piston head portion 32 by a spring 45, the smaller end convolutions grippingly engaging the valve 41, while the larger convolution at the opposite end snaps into locking engagement with the annular groove 42 in the piston head portion 32.

A wear-piece 50, preferably U-shaped and having side members 51 and 52, fits into the recess of the piston 26 whereby the side member 51 of said U-shaped member engages with the wall 29 of the piston head portion 31 while the side member 52 engages with the wall portion 30 of the piston head portion 32. A pin 53, supported in the piston head portion 31, extends into an aperture provided in the side member 51 of the U-shaped member 50 while a similar pin 54 extends through the piston head portion 32 into a similar opening in the side member 52 of the U-shaped member 50. These pins 53 and 54 maintain the U-shaped member in proper position in the piston. U-shaped member 50 may be made of any suitable wear-resisting material.

The casing 23 of the shock absorber provides bearing portions 60 and 61 in which is journalled the rocker shaft 62, one end of which, 63, extends to the outside of the casing and has the shock absorber operating arm 64 securely mounted thereon. The free end of arm 64 is swivelly secured to one end of the connecting link 65, the other end of said connecting link being secured to the bracket 66 anchored to the axle 21 in any suitable manner.

Within the casing 23, rocker shaft 62 is provided with a rocker arm 67, two sides of which are flat, while the other two sides have circularly shaped portions designated by the numerals 68 and 69. The circular surface 68 engages with the side member 51 of the U-shaped member 50, while the circular surface 69 engages with the other side member 52 of said U-shaped member. Oscillation of the arm 67 reciprocates the piston 26 within the cylinder 25.

Each compression chamber 33 and 34 is provided with a pressure relief valve whereby fluid within either compression chamber may escape therefrom into the fluid reservoir when pressure is exerted upon the fluid within the compression chamber. Inasmuch as both relief valves are substantially alike in structure, only one of them will be described detailedly.

The casing has a port 70 for connecting compression chamber 33 with the fluid reservoir 24 and a port 71 for connecting compression chamber 34 with said fluid reservoir. An opening 72 is provided in the casing substantially in coaxial alignment with the port 70, said opening having screw threads for receiving the screw plug 73. Screw plug 73 supports a valve pin 74 which extends coaxially into the port 70 and is of lesser transverse dimensions than said port. A valve 75 is slidably supported on a pin 74 and is maintained in engagement with the casing surface surrounding the port 70, normally to close said port, by a spring 76 which is interposed between the screw plug 73 and the valve 75. The valve, which is yieldably urged to close port 71 of compression chamber 34, is designated by the numeral 77.

Figure 2:
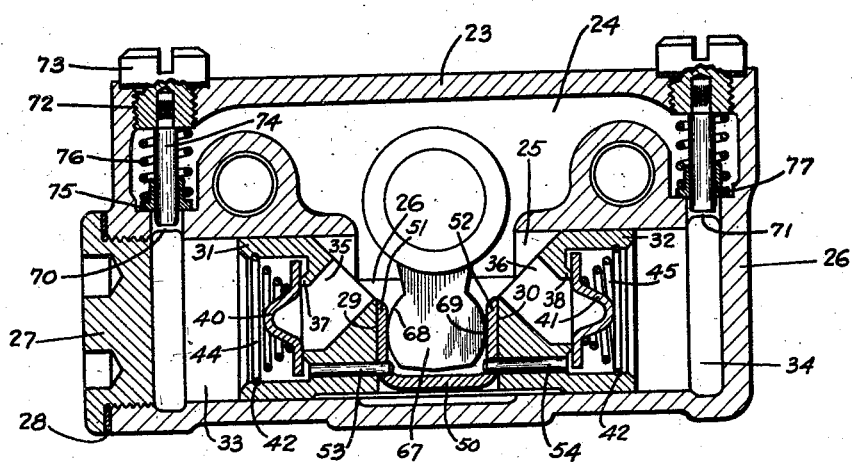
Fig. 2 is a longitudinal sectional view taken through the shock absorber.
Figure 4:
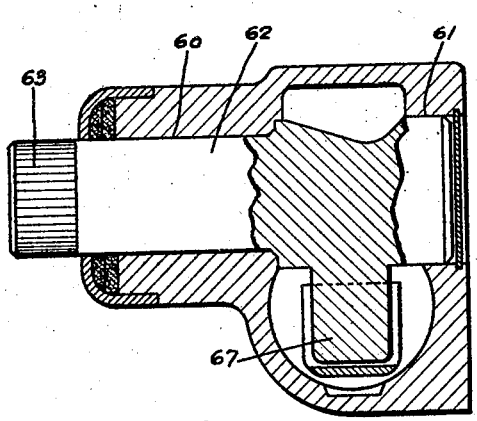
Fig. 4 is a sectional view taken transversely through the center of the shock absorber.
Figure 3:
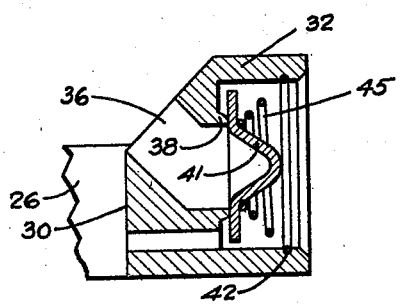
Fig. 3 is an enlarged fragmentary sectional view of one end of the piston.

The operation of the device is as follows:

In response to the road wheels striking obstructions in the roadway, the axle 21 is moved toward the frame 20, causing springs 22 to be flexed. Flexing movement of springs 22 result in an upward movement of connecting link 65 which in turn causes a counter-clockwise rotation of arm 64 and its associate shaft 62 and rocker arm 67. Counter-clockwise rotation of arm 67 will move the piston 26 to the right as regards Fig. 2 and thus fluid within the compression chamber 34 will have pressure exerted thereon which, when reaching a predetermined value, will move valve 77 from its seat, and thus establish a pressure relief fluid flow from the compression chamber 34 into the fluid reservoir 24. This fluid flow is restricted by the valve 77 and thus the flexing movement of the springs 22 toward the frame 20 will be comparatively resisted.

As the piston 26 moves toward the right, the valve 40 of the piston head portion 31 will be moved from engagement with its valve seat and thus a substantially free flow of fluid will be established from the fluid reservoir 24 through duct or passage 35, past the valve 40 into the compression chamber 33.

As soon as the springs 22 have reached the limit of their flexure caused by the particular obstruction in the roadway, they will have a tendency to return to normal, unflexed position with a sudden rebounding movement which, if not resisted or cushioned in any way, may result in disagreeable shocks and jolts being transmitted to the frame 20 upon which the body of the vehicle is mounted. In order to eliminate such shocks and jolts, the present device restricts the rebounding movement of the springs for, as the springs tend to return to normal position, the link connection 65 will move the arm 64 and its associate shaft and lever 67 in a clockwise direction. This causes the piston 26 to be moved toward the left as regards Fig. 2 and the fluid within compression chamber 33 will have pressure exerted thereupon, said pressure when reaching a proper value, forcing the valve 75 from its seat against the effect of spring 76 whereby a restricted flow is established from the compression chamber 33 through the port 70, past the valve 75 into the fluid reservoir 24. The restriction to the flow of fluid from the valve 75 will resist the movement of the piston toward the left and consequently the counter-clockwise movement of the arm 64 and thus the rebounding or deflexing of the springs 22.

The feature of the present invention resides in mounting the valves 40 and 41 solely upon the end of a coil spring whereby the valves may be said to be mounted in a wobbly fashion, thereby assuring proper seating and alignment with their respective valve seats. This method of mounting the valves 40 and 41 substantially eliminates sticking, which might occur when a valve of this type is mounted slidably upon a rod. Again, if the rod is not in absolute proper alignment with the valve seat, proper engagement of the valve with the valve seat is prevented, causing leaks which greatly affect the efficiency of the shock absorber.

While the form of embodiment of the present invention as herein disclosed, constitutes a preferred form, it is to be understood that other forms might be adopted, all coming within the scope of the claims which follow:

What is claimed is as follows:

1. A shock absorber comprising, in combination, a casing presenting a fluid reservoir and a cylinder; a piston in the cylinder, having a skirt portion and a passage providing for the transfer of fluid from one side of the piston to the other; means for operating the piston; a spring, helically wound in frustroconical shape, the larger convolution, at the one end lockingly engaging the piston skirt portion; and a valve, gripped by the smaller convolutions at the other end of the spring so as to be movably supported thereby, said spring urging the valve into piston passage closing position.

2. A shock absorber comprising, in combination, a casing presenting a fluid reservoir and a cylinder; a piston in said cylinder, said piston comprising head and skirt portions: a duct in the head portion, having an annular ridge surrounding it, providing a valve-seat; an annular groove in the inside surface of the piston skirt; a valve and a coil spring, the one end convolution of which is seated in the annular groove of the piston, the convolution adjacent the other end of the spring gripping the valve, said spring yieldably supporting said valve and urging it into engagement with the valve seat.

3. A shock absorber comprising, in combination, a casing presenting a fluid reservoir and a cylinder; a piston in the cylinder, having a passage providing for the transfer of fluid from one side of the piston to the other and an interior, annular groove; means for operating the piston; a spring supported in the annular groove of the piston; a disc-valve solely supported by said spring which yieldably urges the valve into engagement with the piston normally to close the passage therein.

4. A shock absorber comprising, in combination, a casing presenting a fluid reservoir and a cylinder; a piston in said cylinder forming a compression chamber therein said piston having an interior, annular groove; inlet and outlet passages for said compression chamber; a valve slidably supported upon a valve pin, and yieldably urged to close the compression chamber outlet passage; and a valve solely supported by a spring which yieldably urges the valve to close the compression chamber inlet passage, the convolution at one end of the spring grippingly engaging the valve, the convolution at the other end of said spring lockingly seating in the annular groove of the piston.

5. A shock absorber comprising, in combination, a casing presenting a fluid reservoir and a cylinder; a piston in said cylinder, said piston having a recess intermediate its ends providing spaced head portions on the piston; a U-shaped wear-piece in said recess; pins in the piston head portions engaging the wear-piece to maintain it within the wear-piece; and an oscillatable lever extending into the wear-piece for operating the piston.

In testimony whereof I hereto affix my signature.

WILLIAM A. CHRYST.